(12) United States Patent
Hsu et al.

(10) Patent No.: US 8,140,602 B2
(45) Date of Patent: Mar. 20, 2012

(54) PROVIDING AN OBJECT TO SUPPORT DATA STRUCTURES IN WORM STORAGE

(75) Inventors: Windsor Wee Sun Hsu, San Jose, CA (US); Xiaonan Ma, Sunnyvale, CA (US)

(73) Assignee: International Business Machines Corporation, Armonk, NY (US)

( * ) Notice: Subject to any disclaimer, the term of this patent is extended or adjusted under 35 U.S.C. 154(b) by 444 days.

(21) Appl. No.: 12/255,201

(22) Filed: Oct. 21, 2008

(65) Prior Publication Data

US 2009/0049086 A1 Feb. 19, 2009

Related U.S. Application Data

(63) Continuation of application No. 11/244,270, filed on Oct. 5, 2005, now Pat. No. 7,487,178.

(51) Int. Cl.
*G06F 17/30* (2006.01)
*G06F 17/00* (2006.01)
(52) U.S. Cl. ......... 707/821; 707/823; 711/100; 711/112
(58) Field of Classification Search .......... 707/821–831; 711/100, 112
See application file for complete search history.

(56) References Cited

U.S. PATENT DOCUMENTS

| | | | |
|---|---|---|---|
| 5,406,529 A | 4/1995 | Asano | |
| 5,535,188 A | 7/1996 | Dang et al. | |
| 5,553,019 A | 9/1996 | Sandvos et al. | |
| 5,664,189 A | 9/1997 | Wilcox et al. | |
| 5,960,194 A | 9/1999 | Choy et al. | |
| 6,128,771 A | 10/2000 | Tock et al. | |
| 6,330,210 B1 | 12/2001 | Weirauch et al. | |
| 6,339,810 B1 | 1/2002 | Basham et al. | |
| 6,615,330 B2 | 9/2003 | Debiez et al. | |
| 6,724,554 B1 | 4/2004 | Braithwaite et al. | |
| 6,744,713 B1 | 6/2004 | Ko et al. | |
| 6,772,172 B2 | 8/2004 | Leong et al. | |
| 6,775,703 B1 | 8/2004 | Burns et al. | |
| 6,779,080 B2 | 8/2004 | Basham et al. | |
| 6,912,645 B2 | 6/2005 | Dorward et al. | |
| 7,127,461 B1 | 10/2006 | Zhu et al. | |
| 7,155,460 B2 | 12/2006 | McGovern et al. | |
| 7,222,215 B2 | 5/2007 | Sonoda et al. | |
| 7,599,932 B2 * | 10/2009 | Patterson | ............. 1/1 |
| 2003/0126446 A1 | 7/2003 | Debiez et al. | |
| 2003/0163718 A1 | 8/2003 | Johnson et al. | |
| 2005/0050342 A1 | 3/2005 | Boivie et al. | |

(Continued)

OTHER PUBLICATIONS

Office Action from U.S. Appl. No. 11/244,270 dated Jul. 7, 2007.

(Continued)

*Primary Examiner* — Yicun Wu
(74) *Attorney, Agent, or Firm* — Shimokaji & Assoc., P.C.

(57) ABSTRACT

An object storage system provides a storage object to support index structures, logs, and audit trails in WORM storage. The storage object includes a mutable object, an immutable object, or an appendable object. For each storage object, the system maintains an indication of type, such as mutable, immutable, or appendable object type. A mutable object can be arbitrarily modified, an immutable object cannot be modified, and the contents of the appendable object cannot be modified but can be appended with new data. Appended data becomes immutable. The system enables a protection level represented by the object type to be upgraded but not downgraded. Consequently, data committed to be immutable cannot be changed by changing the type of the storage object.

15 Claims, 8 Drawing Sheets

U.S. PATENT DOCUMENTS

| | | |
|---|---|---|
| 2005/0097260 A1 | 5/2005 | McGovern et al. |
| 2005/0135226 A1 | 6/2005 | Weirauch et al. |
| 2005/0135227 A1 | 6/2005 | Weirauch et al. |
| 2005/0210041 A1 | 9/2005 | Taguchi |
| 2006/0004689 A1 | 1/2006 | Chandrasekaran et al. |
| 2006/0095687 A1 | 5/2006 | Hsu et al. |
| 2006/0129588 A1 | 6/2006 | Hsu et al. |

OTHER PUBLICATIONS

Santry et al., "Deciding when to forget in the Elephant file system," pp. 110-123, ACM 1999.

Cox et al., "Pastiche: Making Backup Cheap and Easy," USENIX Association, 5$^{th}$ Symposium on Operating Systems Design and Implementation, pp. 285-298, 2002.

USPS Electronic Postmark (USPS EPM (R)), White Paper, 2003.

"CrytoCards—IBM eServer Cryptographic Hardware Products," downloaded from the WorldWideWeb at URL:http://www.ibm,com/security/cryptocards, on Jul. 20, 2005.

"IBM PCI Cryptographic Coprocessor," downloaded from the WorldWideWeb at URL:http://www.ibm.com/security/cryptocards/pcicc.shtml, on Jul. 20, 2005.

* cited by examiner

```
┌─────────────────────────────────────────┐ ─ 205
│ RECEIVE REQUEST TO CREATE A STORAGE OBJECT │
│         WITH A SPECIFIED NAME           │
└─────────────────────────────────────────┘
                    │
                    ▼
┌─────────────────────────────────────────┐ ─ 210
│   CREATE THE STORAGE OBJECT AND APPLY   │
│            SPECIFIED NAME               │
└─────────────────────────────────────────┘
                    │
                    ▼
┌─────────────────────────────────────────┐ ─ 215
│  RECEIVE REQUEST TO SET TYPE OF THE STORAGE │
│                 OBJECT                  │
└─────────────────────────────────────────┘
                    │
                    ▼
┌─────────────────────────────────────────┐ ─ 220
│        SET TYPE OF THE STORAGE OBJECT   │
└─────────────────────────────────────────┘
                    │
                    ▼
┌─────────────────────────────────────────┐ ─ 225
│  RECEIVE DATA FOR STORAGE OBJECT AND STORE │
│         DATA IN THE STORAGE OBJECT      │
└─────────────────────────────────────────┘
                    │
                    ▼
┌─────────────────────────────────────────┐ ─ 230
│   RECEIVE REQUEST TO CLOSE THE STORAGE  │
│                 OBJECT                  │
└─────────────────────────────────────────┘
                    │
                    ▼
┌─────────────────────────────────────────┐ ─ 235
│            CLOSE THE OBJECT             │
└─────────────────────────────────────────┘
```

PROVIDING AN OBJECT TO SUPPORT DATA STRUCTURES IN WORM STORAGE

CROSS REFERENCE TO RELATED APPLICATIONS

This application is a continuation of U.S. application Ser. No. 11/244,270 filed on Oct. 5, 2005, now U.S. Pat. No. 7,487,178, which is incorporated herein in its entirety by reference.

FIELD OF THE INVENTION

The present invention generally relates to write-once read-many (WORM) storage and in particular to an object that facilitates creation and maintenance of items such as indices, database logs, and audit trails in WORM storage.

BACKGROUND OF THE INVENTION

As critical data are increasingly stored in electronic form, it is imperative that the critical data be stored reliably in a tamper-proof manner. Furthermore, a growing subset of electronic data (e.g., electronic mail, instant messages, drug development logs, medical records, etc.) is subject to regulations governing long-term retention and availability of the data. Recent high-profiled accountability issues at large public companies have further caused regulatory bodies such as the Securities and Exchange Commission (SEC) to tighten their regulations. For instance, Securities Exchange Commission Rule 17a-4, which went into effect in May 2003, specifies storage requirements for email, attachments, memos, and instant messaging as well as routine phone conversations. A requirement in many such regulations is that data must be stored reliably in non-erasable, non-rewritable storage such that the data, once written, cannot be altered or overwritten. Such storage is commonly referred to as WORM (Write-Once Read-Many) storage as opposed to WMRM (Write-Many Read-Many) storage, which can be written many times.

Critical data requires some form of organization such that all of the data relevant to an enquiry can be promptly discovered and retrieved, typically within days and sometimes even within hours. Scanning all of the data in a large volume of data to discover entries that are relevant to an enquiry is not practical. Instead, the data requires organization with some form of direct access mechanism such as an index. Such access mechanisms require storage in WORM storage to prevent the access mechanisms from being tampered. Otherwise, an adversary may modify the direct access mechanism to logically modify the data; e.g., hide an object by removing an index entry or replace an object by modifying the index entry for the original object.

Furthermore, there is often a need to log small amounts of data to WORM storage, for instance, to maintain database logs or non-alterable audit trails of activity in a system. To manage index mechanisms and logs such that they cannot be tampered, some form of WORM storage is required that allows adding new index/log entries while preventing any of the committed entries from being modified.

Although conventional WORM storage technology has proven to be useful, it would be desirable to present additional improvements. Conventional WORM storage systems do not efficiently support index mechanisms and logs. Conventional WORM storage ensures that an object (e.g. file, object, block) is immutable after the object has been committed into the WORM storage system. To store index structures and logs in WORM storage, creation of new objects is required whenever new entries are committed, incurring both performance and space overhead and degrading locality of reference. To improve performance and space overhead, entries can be committed less frequently. However, entries that have not been committed are not guaranteed to be immutable or even to be persistent. Alternatively, a large collection of data can be indexed in a batch. However, this batch index is not available until an entire collection of data is received and indexed. Moreover, as data is added over a period of time, the system creates many indices, each of which may need to be searched to find a particular piece of data.

What is therefore needed is a system, a computer program product, and an associated method for providing an object to support index structures, logs, and audit trails in WORM storage. The need for such a solution has heretofore remained unsatisfied.

SUMMARY OF THE INVENTION

The present invention satisfies this need, and presents a system, a service, a computer program product, and an associated method (collectively referred to herein as "the system" or "the present system") for providing an object to support index structures, logs, and audit trails in WORM storage. The present system comprises an object storage system that supports a storage object comprising differing levels of protection. In one embodiment, the level of protection for the storage object can be upgraded.

In addition to metadata typically associated with an object, the present system maintains, for each storage object, an indication of its level of protection against modification. In an embodiment, the storage object comprises the following levels of protection: modifiable (a mutable object), not modifiable (an immutable object), or appendable (an appendable object). The present system allows a mutable object to be arbitrarily modified. The present system ensures that an immutable object cannot be modified. The present system guarantees that the contents of the appendable object cannot be modified but can be appended with new data; data that is appended to the appendable object becomes immutable.

In one embodiment, the present system enables the level of protection associated with an object, i.e. the type of an object, to be upgraded. The mutable object can be changed to an appendable object; the appendable object can be changed to an immutable object. The immutable object cannot be changed to an appendable object or a mutable object. The appendable object cannot be changed to a mutable object. In this way, data that is committed to be immutable cannot be changed by changing the type of the storage object in which the data is stored.

In one embodiment, the level of protection is valid for a predetermined period of time. In another embodiment, the present system upgrades the level of protection after a predetermined period of time.

The storage object of the present system enables implementation of a WORM index system. An index is divided into index segments each comprising zero or more index entries. The index entries in each index segment are stored in an appendable object. Once written to the appendable object, the written index entries are immutable; i.e., the index entries cannot be changed. A new index entry can be added to the appendable object. Once the new index entry is written to the appendable object, the new index entry is immutable. In this manner, a WORM index cannot be modified to logically modify data that have been indexed, i.e., added to the index.

The storage object of the present system enables implementation of WORM log. The WORM log comprises an appendable object. Entries to the WORM log are written into the appendable object. As entries are written, the entries become immutable. To close the WORM log, the type of the appendable object is upgraded to immutable. In this manner, a WORM log cannot be modified to change entries that have been logged, i.e., added to the log. The WORM logs can be divided into fixed size or fixed duration parts for ease of management. Each of these parts can be stored in an appendable object.

The present system may be embodied in a utility program such as an object storage utility program. The present system provides means for the user to identify a set of data for storage in one or more storage objects of the object storage utility program. The set of data may be, for example, a record, an index, a log, an audit trail, etc. The present system provides means for specifying performance criteria associated with the set of data such as, for example, a level of protection for the data, an expiration time for a log, or a time at which a storage object upgrades a level of protection. The present system further provides means for the user to invoke the object storage utility program to generate and maintain data such as, for example, a record, an index, a log, an audit trail, etc.

BRIEF DESCRIPTION OF THE DRAWINGS

The various features of the present invention and the manner of attaining them will be described in greater detail with reference to the following description, claims, and drawings, wherein reference numerals are reused, where appropriate, to indicate a correspondence between the referenced items, and wherein:

FIG. 6 is comprised of FIGS. 6A and 6B, and represents a process flow chart illustrating a method of searching a WORM index maintained in the storage system of FIG. 1.

DETAILED DESCRIPTION OF PREFERRED EMBODIMENTS

The following definitions and explanations provide background information pertaining to the technical field of the present invention, and are intended to facilitate the understanding of the present invention without limiting its scope:

Appendable: Capable of receiving new data that is appended to existing data. An object of appendable type comprises immutable data that can be appended with new data. Once appended, the new data becomes immutable (WORM).

Immutable or WORM: Incapable of modification or deletion. An object of immutable type cannot be modified, overwritten, or deleted.

Mutable: Capable of modification. An object of mutable type can be modified, overwritten, or deleted.

Figure 1:
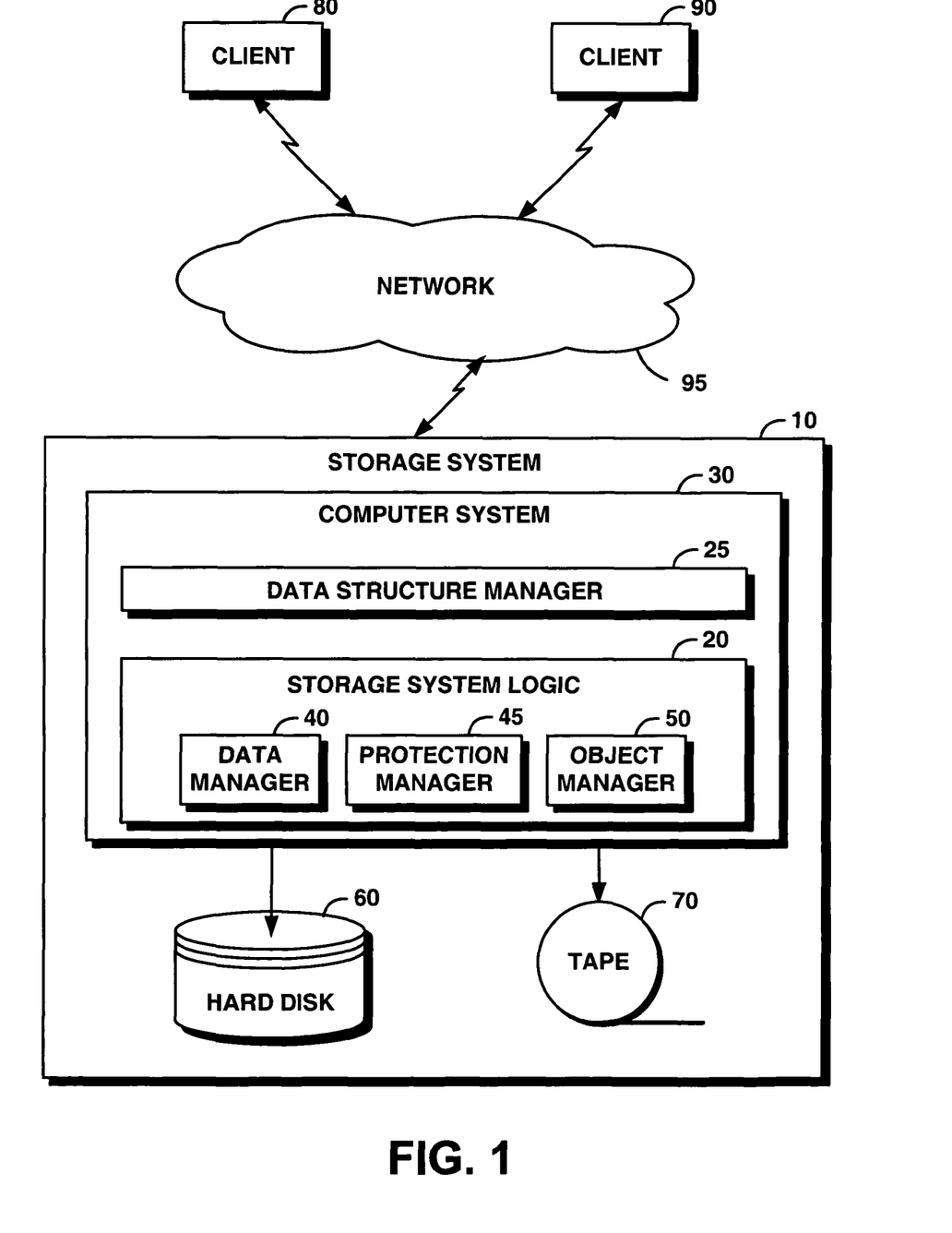
FIG. 1 is a schematic illustration of an exemplary operating environment in which a storage system of the present invention can be used.

FIG. 1 portrays an exemplary overall environment in which a system, a computer program product, and an associated method (the "storage system 10" or the "system 10") for providing an object to support data structures in WORM storage according to the present invention may be used. System 10 comprises a storage system logic 20 that is typically embedded within or installed in a computer system 30 in the form of hardware logic or software programming code. System 10 further comprises a data structure manager 25 that is typically embedded within, or installed in a computer system 30 or clients, such as clients 80, 90 in the form of hardware logic or software programming code.

The storage system logic 20 comprises a data manager 40, a protection manager 45, and an object manager 50. System 10 further comprises a storage media such as, for example, a hard disk 60 and a tape 70. Clients such as clients 80, 90 access system 10 through a network 95 or direct links.

System 10 comprises a storage object. The storage object comprises differing levels of protection against modification. For example, the object manager 50 maintains, for each storage object, an indication of type; e.g., mutable, immutable, or appendable.

The protection manager 45 allows a storage object of mutable type (further referenced herein as a mutable object) to be arbitrarily modified. The protection manager 45 protects a storage object of immutable type (further referenced herein as an immutable object) such that it cannot be changed in any way. The protection manager 45 protects the contents of a storage object of appendable type (further referenced herein as an appendable object) such that the contents cannot be changed. The protection manager 45 allows data to be appended to the appendable object; data appended to the appendable object becomes immutable. The data manager 40 handles the flow of data into and out of the system.

The object manager 50 allows a level of protection for the storage object to be upgraded by, for example, modifying the type of the storage object. For example, the mutable object can be changed to the appendable object; the appendable object can be changed to the immutable object. The immutable object cannot be changed to the appendable object or the mutable object. The appendable object cannot be changed to the mutable object. In this way, data that is committed to be immutable cannot be changed by changing the type of the storage object in which the data is stored.

Figure 2:
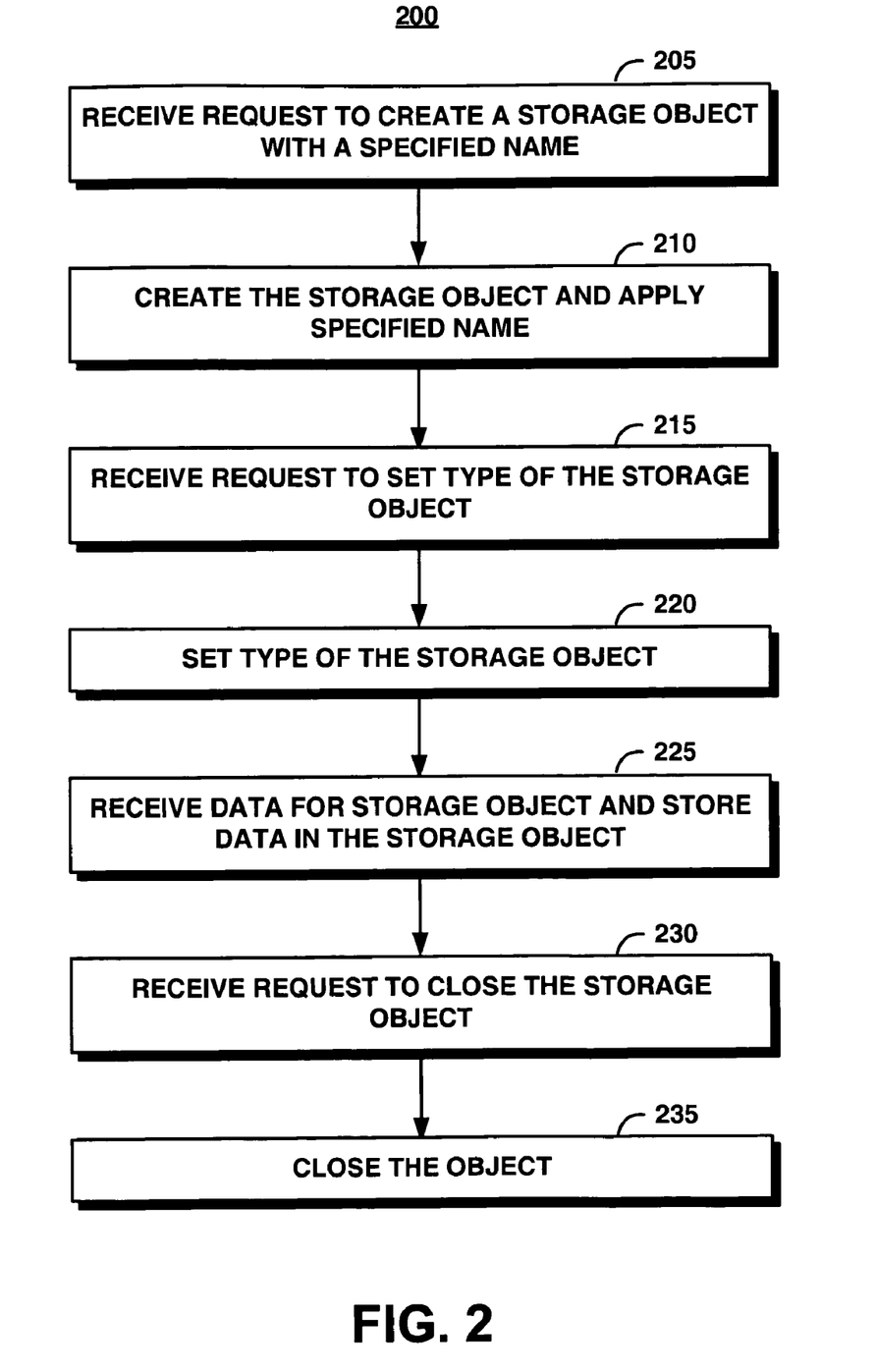
FIG. 2 is a process flow chart illustrating a method of the storage system of FIG. 1 in creating an object.

FIG. 2 illustrates a method 200 of system 10 in creating a storage object. System 10 receives a request to create a storage object with a specified name (step 205). Object manager 50 creates the storage object and applies the specified name to the created storage object (step 210). System 10 receives a request to set a type of the storage object (step 215) as mutable, immutable, or appendable. Object manager 50 sets the type of the storage object (step 220). Data manager 40 receives data for storage in the storage object and stores the data in the storage object (step 225). System 10 receives a request to close the storage object (step 230) and object manager 50 closes the storage object (step 235).

In one embodiment, object manager 50 determines whether a storage object with the specified name already exists. If so, system 10 returns a failure to the create request. In another embodiment, object manager 50 appends a version number to the specified name if an object with the specified name already exists in the system. In a further embodiment, determining whether an object already exists in the system comprises determining whether an object with the specified name is in the process of being created. In yet another embodiment, the object name is not specified in the request to create an object. Instead, object manager 50 determines a name to assign the object and system 10 returns the assigned name to the user of the system.

Figure 3:
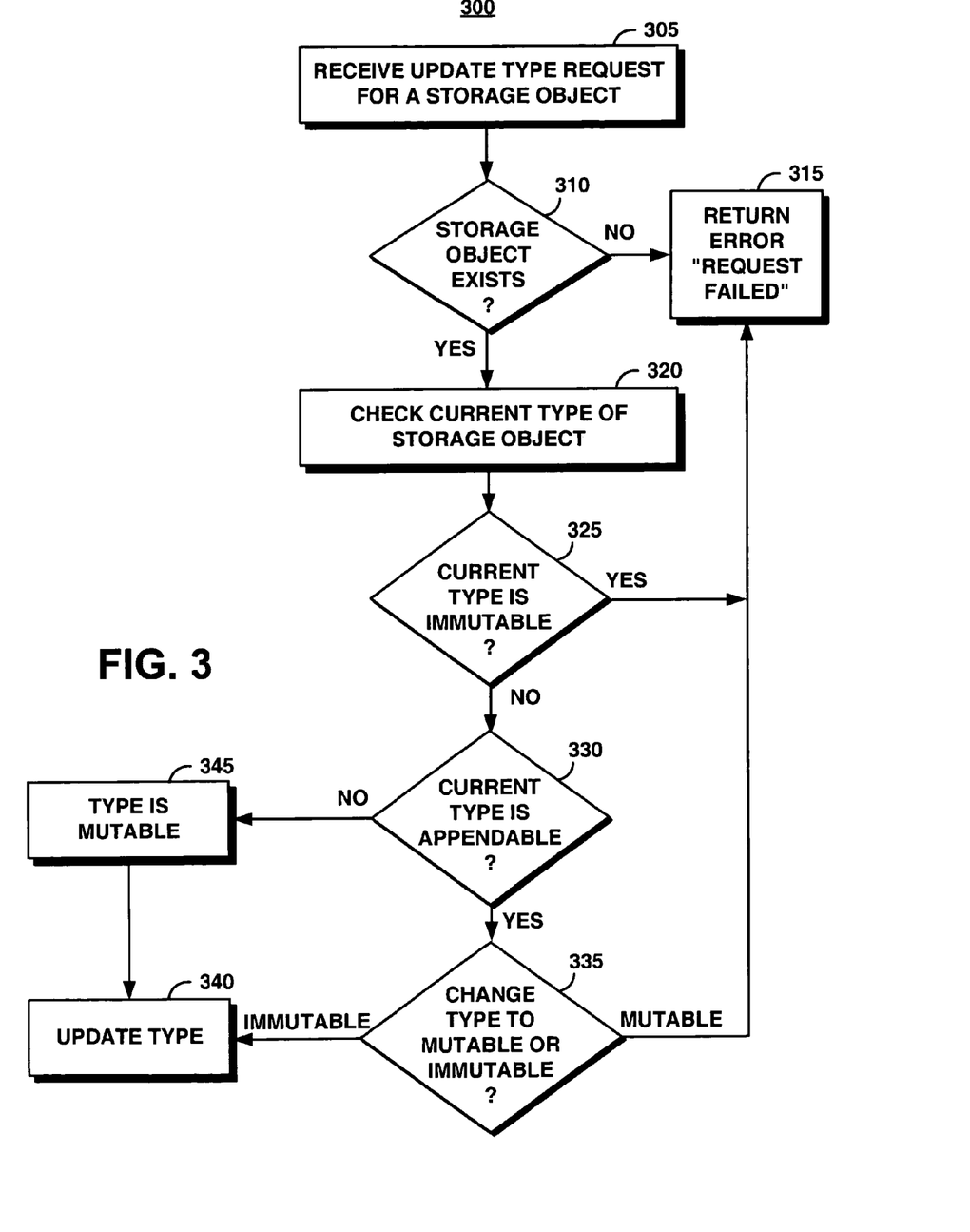
FIG. 3 is a process flow chart illustrating a method of the storage system of FIG. 1 in upgrading a level of protection of an object.

FIG. 3 illustrates a method 300 of system 10 in updating the type of the storage object. System 10 receives an "update type" request for a storage object (step 305), i.e., a request to update the type of the storage object. Object manager 50 determines whether the requested storage object exists (decision step 310). If the requested storage object does not exist, system 10 returns an error "request failed" (step 315). If the requested storage object does exist (decision step 310), object manager 50 checks a current type of the requested storage object (step 320). The requested storage object may comprise the immutable type, the appendable type, or the mutable type.

If the current type of the requested storage object is immutable (decision step 325), the type of the requested storage object cannot be changed. Consequently, system 10 returns the error "request failed" (step 315). If the current type of the requested storage object is appendable (decision step 330), object manager 50 determines whether the update type request is a request to change from an appendable type to an immutable type or a request to change from an appendable type to a mutable type (decision step 335). An appendable object can only be changed to an immutable object.

If the update type request attempts to change an appendable object to a mutable object, system 10 returns the error "request failed" (step 315). If the update type request attempts to change an appendable object to an immutable object (decision step 335), object manager 50 performs the requested update type request on the storage object (step 340). If, at decision step 330, the current type is not appendable, the current type is mutable (step 345). A mutable object can be changed to either an appendable object or an immutable object. Consequently, object manager 50 performs the update type request (step 340). In one embodiment, object manager 50 stores a time a storage object is created, a time a storage object becomes an appendable object, and a time the storage object becomes an immutable object.

Figure 4:
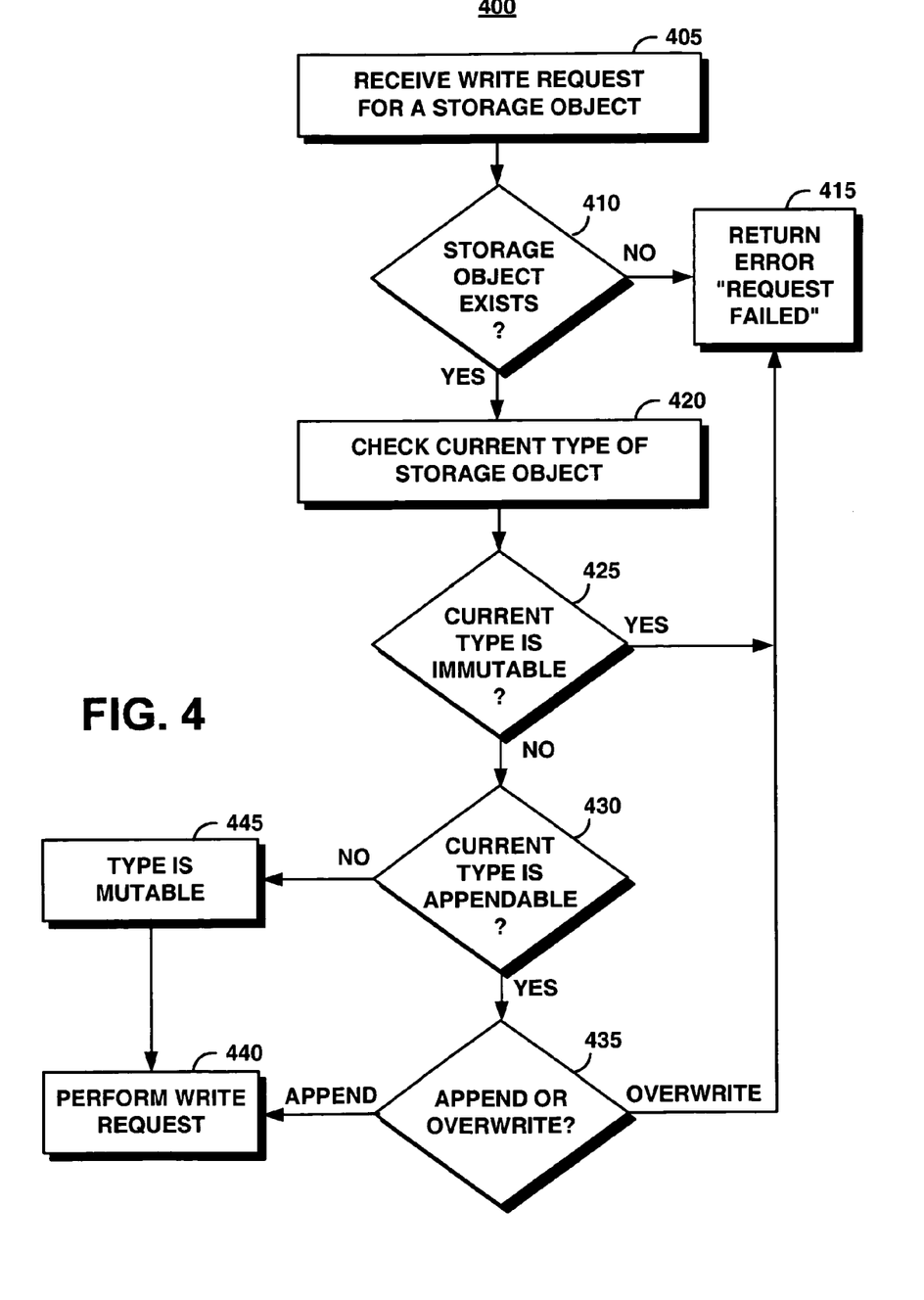
FIG. 4 is a process flow chart illustrating a method of the storage system of FIG. 1 in writing data to an object.

FIG. 4 illustrates a method 400 of system 10 in writing to a storage object. System 10 receives a write request for a storage object (step 405). Object manager 50 determines whether the requested storage object exists (decision step 410). If the requested storage object does not exist, system 10 returns an error "request failed" (step 415). If the requested storage object does exist (decision step 410), object manager 50 checks a current type for the requested storage object (step 420). The requested storage object may comprise the immutable type, the appendable type, or the mutable type.

If the current type of the requested storage object is immutable (decision step 425), the requested storage object cannot be modified or overwritten. Consequently, system 10 returns the error "request failed" (step 415). If the current type of the requested storage object is appendable (decision step 430), protection manager 45 determines whether the write request is an append request or an overwrite request (decision step 435). If the write request is an overwrite request, system 10 returns the error "request failed" (step 415). The contents of an appendable object cannot be changed or overwritten. If the write request is an append request (decision step 435), data manager 40 performs the requested write request on the storage object (step 440). If at decision step 430 the current type is not appendable, the current type is mutable (step 445). A mutable object can be modified or overwritten. Consequently, data manager 40 performs the write request (step 440).

When a commit of an operation occurs, system 10 ensures that any effects of that operation are made persistent, even across system crashes or power failures. In one embodiment, all operations are automatically committed after they are performed.

Figure 5:
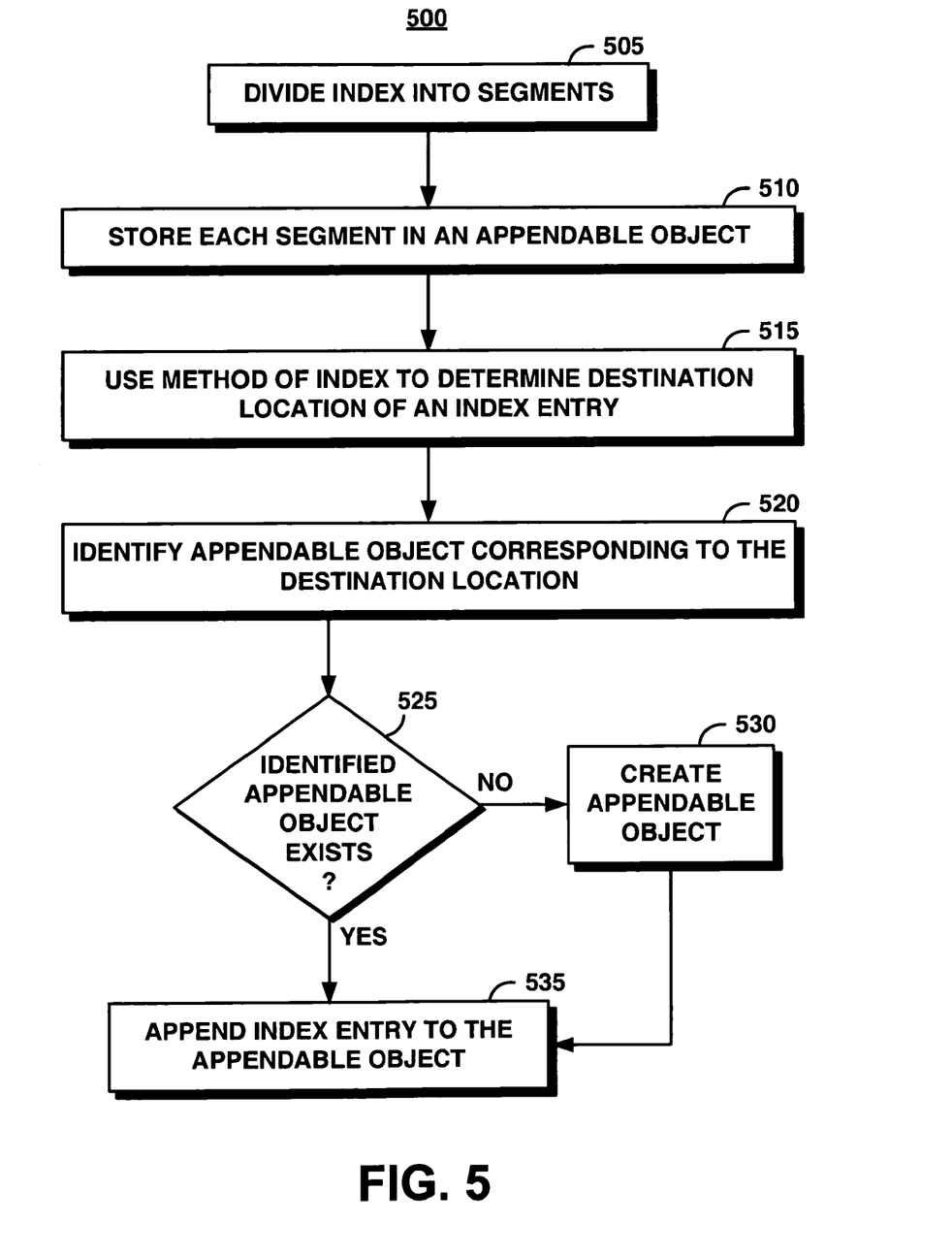
FIG. 5 is a process flow chart illustrating a method of maintaining a WORM index using the storage system of FIG. 1.

FIG. 5 illustrates a method 500 of system 10 in maintaining a WORM index. Data structure manager 25 divides the index into segments (step 505). The index can be any type of index such as, for example, a B-Tree, a hash table, or inverted index. For example, if the index is a hash table, each bucket in the hash table can be a segment. If the index is a B-Tree, each node in the tree can be a segment. If the index is an inverted index, each posting list can be a segment. Data structure manager 25 stores each segment in an appendable object (step 510). The appendable object allows index entries to be stored but not modified. Consequently, an adversary cannot modify the index to logically modify the data that the index represents; e.g., hide an object by removing an index entry or replace an object by modifying the index entry for the original object.

To store an index entry, data structure manager 25 uses a method of the index to determine a destination location of the index entry (step 515). For example, if the index is a hash table, a destination location of the index entry is identified by computing a hash function on the index key of the index entry. Data structure manager 25 identifies which appendable object corresponds to the determined destination location (step 520). Data structure manager 25 determines whether the identified appendable object exists (decision step 525). If not, data structure 25 creates an appendable object corresponding to the destination location determined in step 525 (step 530). Data structure manager 25 appends the index entry to the appendable object (step 535). Any previous index entry remains immutable in the appendable object, providing an immutable, appendable index structure. In one embodiment, entries in each object are ordered by time of insertion rather than by an index key.

Figure 6A:
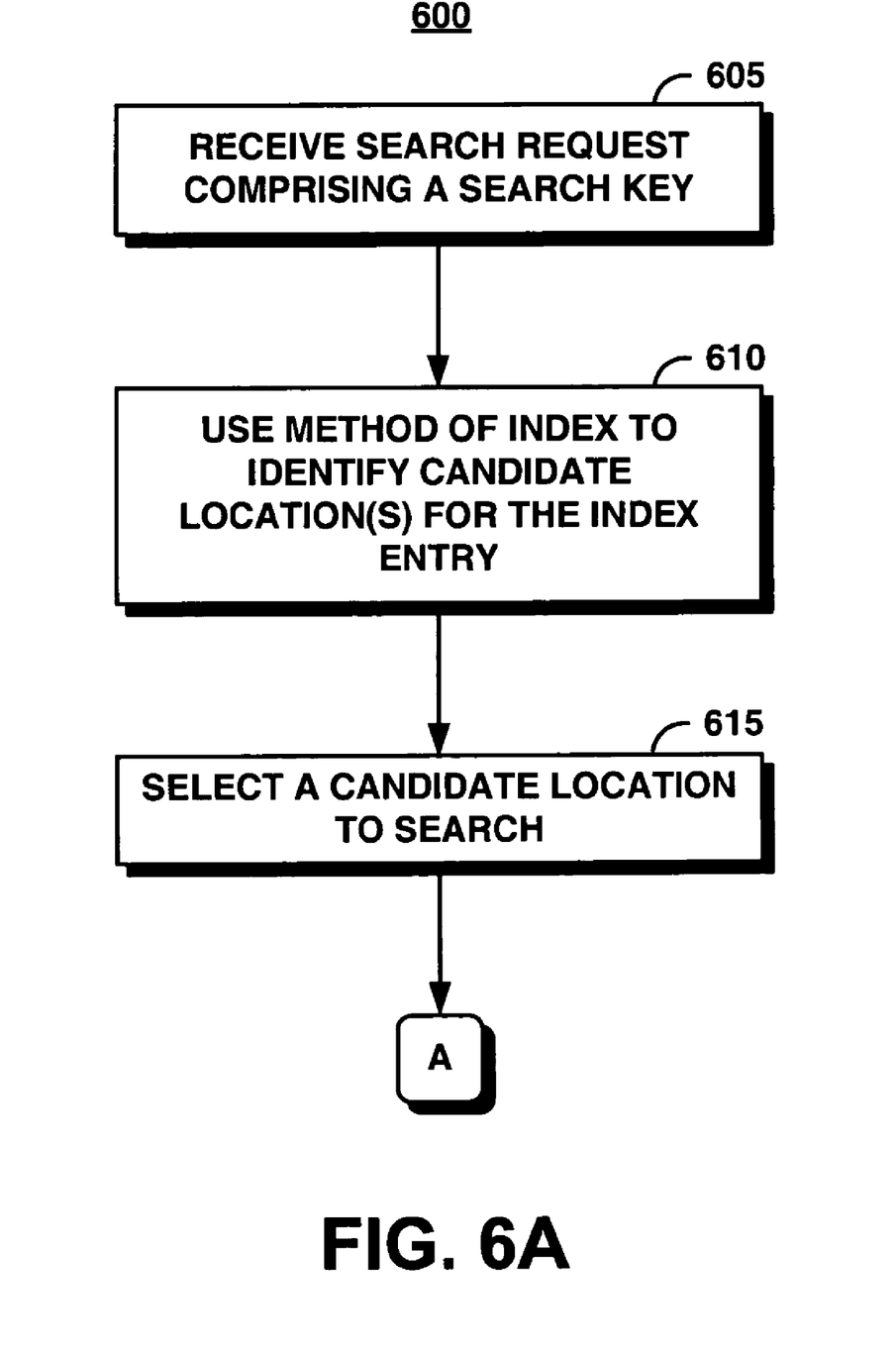
Figure 6B:
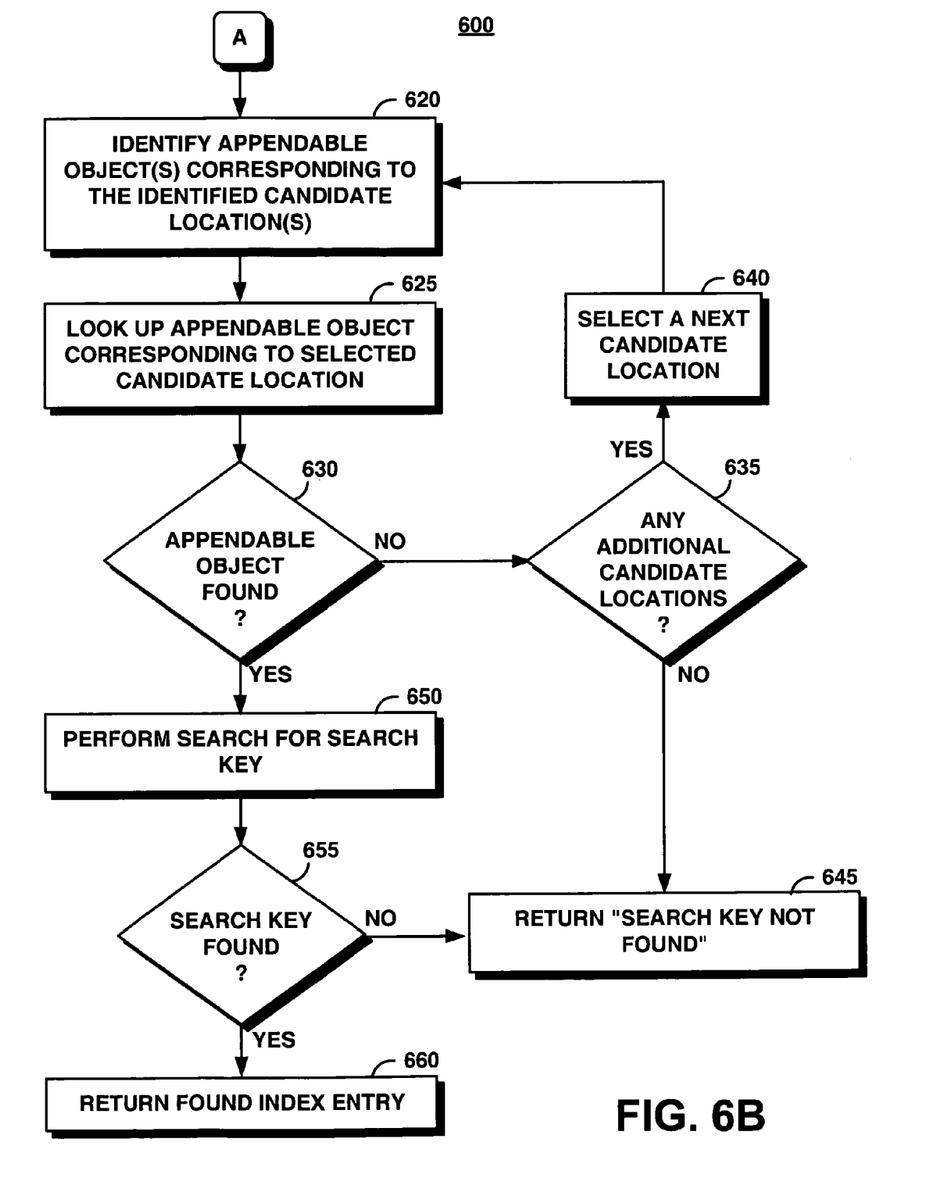

FIG. 6 illustrates a method 600 of System 10 in searching a WORM index. System 10 receives a search request comprising a search key for an index entry (step 605). Data structure manager 25 uses a method of the index to determine one or more candidate locations for the index entry (step 610). Data structure manager 25 selects a candidate location to search (step 615). Data structure manager 25 identifies an appendable object corresponding to the selected candidate location (step 620).

Data structure manager 25 looks up the appendable object corresponding to the selected candidate location (step 625). If the appendable object is not found (decision step 630), data structure manager 25 determines whether any additional candidate locations correspond to the index entry (decision step 635). If additional candidate locations are identified, data structure manager 25 selects a next candidate location and repeats steps 620, 625, and 630. If no additional candidate locations are identified (decision step 635), no results are found for the search and System 10 returns a message "Search Key Not Found" (step 645).

If data structure manager 25 finds an appendable object corresponding to the selected location (decision step 630), data structure manager 25 performs a search for the search key (step 650) using, for example, a linear scan. If the search key is not found (decision step 655), system 10 returns a message "Search Key Not Found" (step 645). If the search key is found, system 10 returns the found index entry (step 660).

In one embodiment, the index may comprise multiple entries corresponding to the search key. Data structure manager 25 searches the candidate locations to return all the index entries corresponding to the search key.

Figure 7:
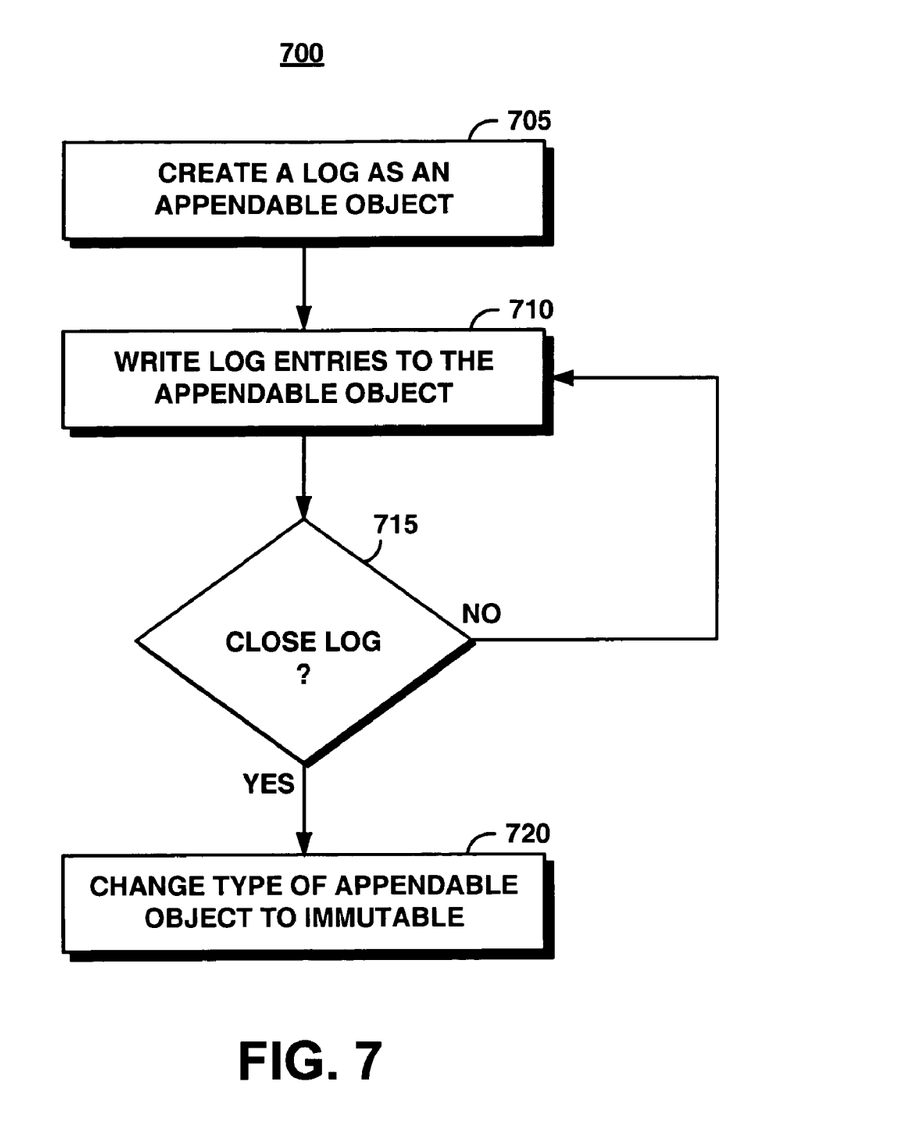
FIG. 7 is a process flow chart illustrating a method of maintaining a WORM log using the storage system of FIG. 1.

FIG. 7 illustrates a method 700 of system 10 in creating and maintaining a log such as an audit trail, a database log, or some other type of journal. Data structure manager 25 creates a log as an appendable object (step 705). Data structure manager 25 writes log entries to the appendable object (step 710). If, according to some predetermined criteria such as, for example, time, data structure manager 25 determines to close the log (decision step 715), data structure manager 25 changes the type of the appendable object to immutable (step 720). The log can no longer be modified. Otherwise (at decision step 715), data structure manager 25 continues to write log entries to the appendable object (step 710) until the log is closed.

Each log operation can be committed immediately after the log operation has been performed. In one embodiment, several operations are committed in a group to improve performance. Typically, a log is divided into fixed size or fixed duration parts for ease of management. Each of these parts can be stored in a storage object of System 10.

It is to be understood that the specific embodiments of the invention that have been described are merely illustrative of certain applications of the principle of the present invention. Numerous modifications may be made to the system and method for providing an object to support data structures in WORM storage described herein without departing from the spirit and scope of the present invention.

Moreover, while the present invention is described for illustration purpose only in relation to WORM storage, it should be clear that the invention is applicable as well to, for example, storage that is write-once for a specified period of time after the data is written. In other words, it should be clear that an immutable object may be protected from modification only for a specified period of time. Furthermore, while the invention is described for illustration purpose only in relation to mutable, immutable and appendable files, it should be apparent that the invention includes other levels of protection against modification.

It should also be clear that the invention comprises different methods of adding data to an object, such as, for example, appending, prepending, etc. The idea of dividing an object into segments, allowing segments to be added to an object, and allowing data to be added to segments within an object also falls within the scope of the current invention. Furthermore, while the present invention is described for illustration purpose only in relation to index and log structures, it should be clear that the invention is applicable as well to, for example, any other incrementally growing data structure in WORM storage. Furthermore, it should be apparent that the object of the present invention could be a file, block, or other collection of data.

What is claimed is:

1. A system for storing data comprising:
a data manager for receiving data to be stored in a Write-Once-Read-Many (WORM) storage system;
an object manager for handling objects in which the received data is stored, the object manager configured to create a first object and associate a protection level with the first object,
wherein the object manager changes the protection level of the first object from mutable to appendable, and from appendable to immutable,
wherein the immutable protection level prevents the first object from being modified, overwritten, and deleted, the mutable protection level allows the first object to be modified, overwritten, and deleted, and the appendable protection level allows the first object to be appended to existing data such that once appended, data becomes immutable;
a protection manager configured to determine whether the received data is to be added to the first object, and to determine the protection level of the first object, wherein the protection manager rejects the data unless the protection manager determines that the data is to be added to the first object, in which case the protection manager adds the data to the first object; and
a data structure manager configured to maintain a data structure and a WORM log in the storage system, wherein the data structure manager maintains a WORM index of the data structure in the storage system by:
dividing the WORM index into at least one segment; and
storing the segment into a second object, wherein the second object is appendable.

2. The system of claim 1 wherein
the data structure manager stores the segment into the second object by:
determining a destination location of the segment;
identifying the second object that corresponds to the determined destination location; and
appending the WORM index entry to the second object.

3. The system of claim 1 wherein:
the data manager stores the received data in the first object;
the object manager applies a specified name to the first object;
the object manager appends a version number to the specified name if the specified name is already in use or in the process of being created;
the protection manager determines whether to accept data for storage in the first object based on the protection level associated with the first object;
the data structure manager maintains the WORM log by:
creating the WORM log as a third object, wherein the third object is appendable;
writing log entries to the WORM log; and
changing the WORM log from an appendable type object to an immutable type object; and
the object manager closes the WORM loge.

4. The system of claim 3 wherein the object manager allows the protection level associated with the first object to be upgraded and does not allow the protection level associated with the first object to be downgraded.

5. The system of claim 3 wherein the object manager maintains a timestamp associated with the time at which the protection level of the first object has been upgraded.

6. The system of claim 3 wherein the level of protection expires after a first predetermined time period.

7. The system of claim 3 wherein the level of protection is upgraded after a predetermined time period.

8. The system of claim 6, wherein the level of protection is upgraded after a second predetermined time period.

9. The system of claim 3 wherein the protection manager protects immutable type objects from modification, protects appendable type objects from modification other than addition of data and upgrade to immutable objects, and permits mutable type objects to be modified.

10. The system of claim 3 wherein:
the mutable type objects are allowed to be changed to appendable type or immutable type objects;
appendable type objects are only allowed to be changed to immutable type objects; and
immutable type objects are not allowed to be changed.

11. The system of claim 8, wherein the data structure manager closes the WORM log after a third predetermined time period.

12. A computer program product having program code on a computer-readable Write-Once-Read-Many (WORM) storage medium, comprising:
- program code for instructing a data manager to receive the data to be stored;
- program code for instructing an object manager to handle objects in which the received data is stored, the object manager creating an object, applying a specified name to the object, and associating a protection level with the object, wherein the object manager changes the protection level of the object from mutable to appendable, and from appendable to immutable,
  - wherein the immutable protection level prevents the object from being modified, overwritten, and deleted,
  - the mutable protection level allows the object to be modified, overwritten, and deleted, and
  - the appendable protection level allows the object to be appended to existing data such that once appended, data becomes immutable;
- program code for instructing a protection manager to determine whether the received data is to be added to the object; and
- program code for instructing the data structure manager to maintain a data structure including a WORM log;
- wherein the protection manager rejects the data unless it determines that the data is to be added to the object, in which case the data manager adds the data to the object.

13. The computer program product of claim 12 wherein the storage system comprises a WORM storage system; and
- wherein the data structure manager maintains the data structure in the WORM storage by:
- dividing the data structure into at least one segment; and
- storing the segment in the object.

14. The computer program product of claim 12 wherein:
- the object manager associates a protection level with the object;
- the object manager appends a version number to the specified name if the specified name is already in use or in the process of being created;
- the protection manager determines whether to accept data for storage in the object based on the protection level associated with the object; and
- the data structure manager maintains the WORM log by:
  - creating the WORM log as an appendable object;
  - writing log entries to the WORM log; and
  - changing the WORM log to an immutable object.

15. The computer program product of claim 14 wherein the object manager allows the protection level associated with the object to be upgraded and does not allow the protection level associated with the object to be downgraded.

* * * * *